May 2, 1967 F. M. WOOD 3,317,824
METHOD OF AND APPARATUS FOR MAGNETICALLY INSPECTING
FERROMAGNETIC MEMBERS FOR INSIDE AND OUTSIDE SURFACE
DISCONTINUITIES AND ASCERTAINING THEREBETWEEN
Filed March 21, 1963 3 Sheets-Sheet 3

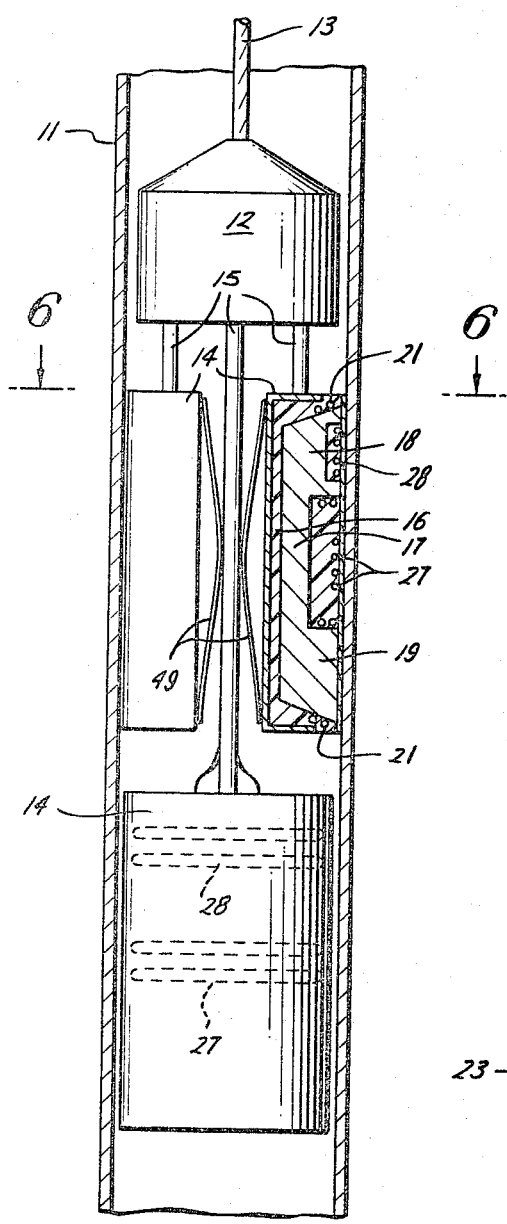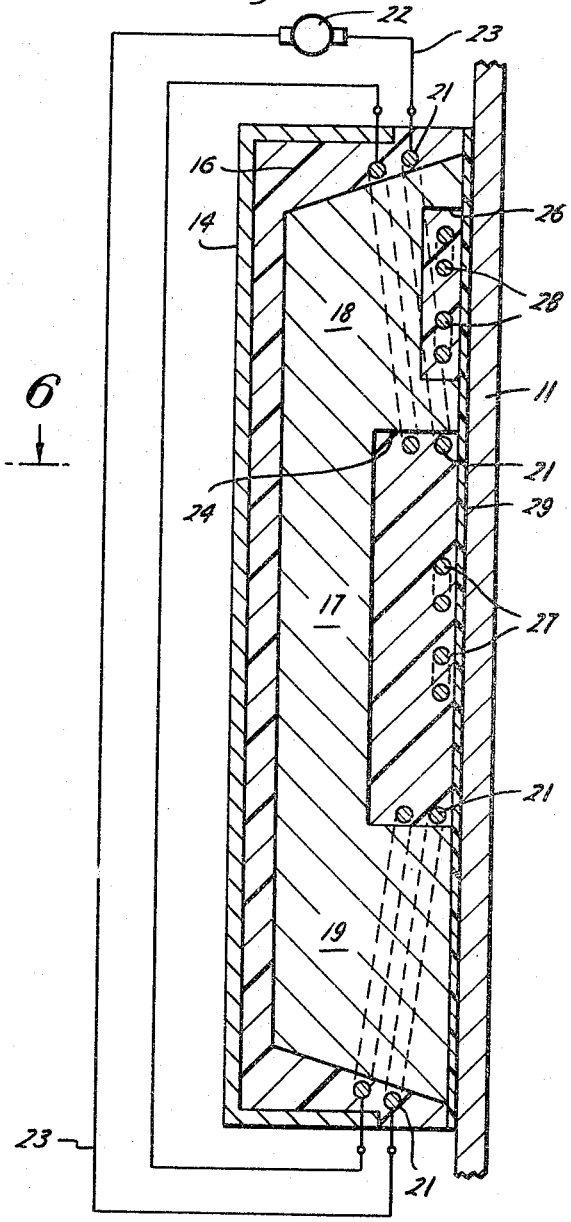
Fig. 1
Fig. 2
Fenton M. Wood
INVENTOR.

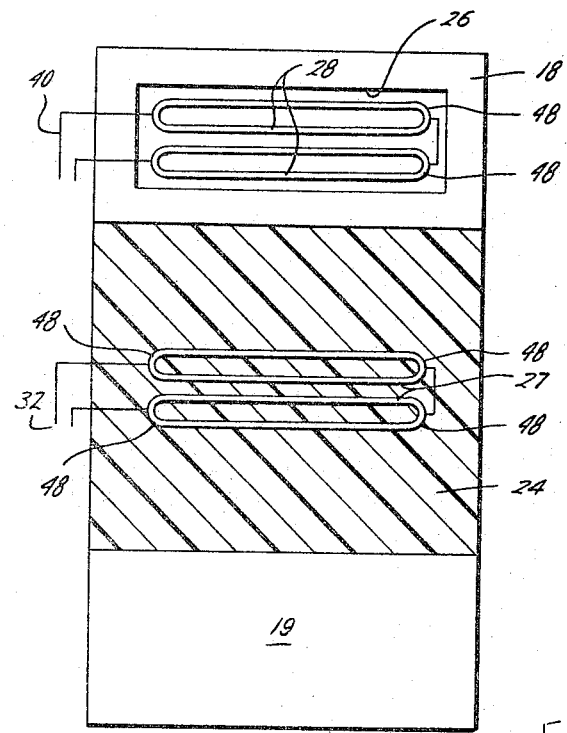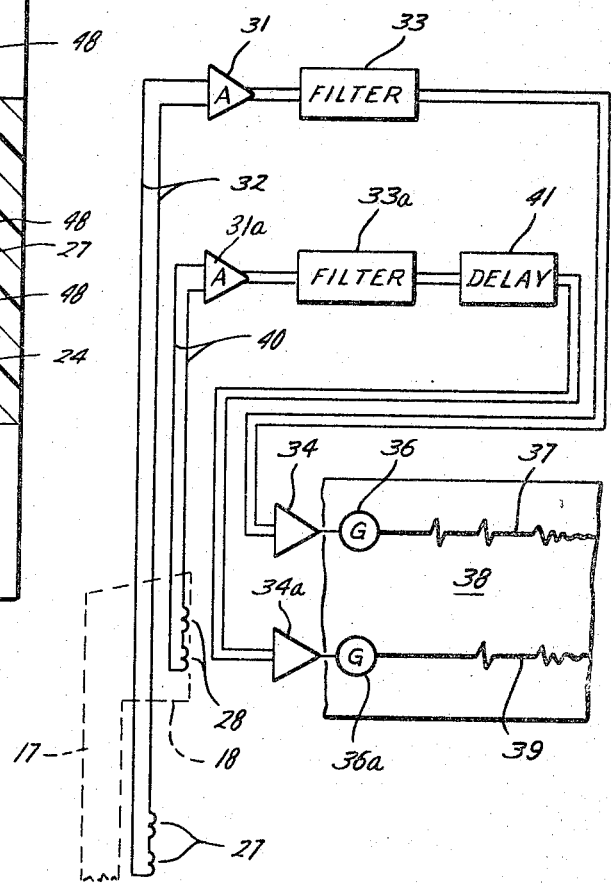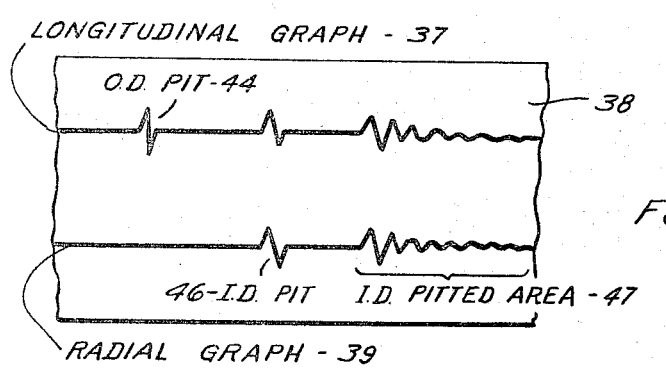

Fenton M. Wood
INVENTOR.

BY
ATTORNEYS

United States Patent Office 3,317,824
Patented May 2, 1967

3,317,824
METHOD OF AND APPARATUS FOR MAGNETICALLY INSPECTING FERROMAGNETIC MEMBERS FOR INSIDE AND OUTSIDE SURFACE DISCONTINUITIES AND ASCERTAINING THEREBETWEEN
Fenton M. Wood, Sugarland, Tex., assignor, by mesne assignments, to American Machine & Foundry Company, New York, N.Y., a corporation of New Jersey
Filed Mar. 21, 1963, Ser. No. 266,976
15 Claims. (Cl. 324—37)

This invention relates to a method and apparatus for magnetically testing a ferromagnetic member for both inside and outside discontinuities. More particularly the invention relates to a method and apparatus for simultaneously testing ferromagnetic members such as tubular well casing for both inside and outside surface discontinuities such as pits and the like. It is likewise useful for detecting discontinuities in the surfaces of barstock, flatplate and other ferromagnetic members.

It has long been common practice to inspect various metallic elements or members by the use of a magnetic field established in the member to be inspected. Such inspection methods have utilized various scanning means to determine variations in flux leakages and the like and to record the effects thereof. However, there has long been need for a device which, when used for inspecting certain types of ferromagnetic materials, could measure quickly and accurately discontinuities and indicate whether or not the discontinuities were either inside or outside. Thus, while certain prior art methods and apparatuses have proved relatively satisfactory for inspecting discontinuities in the surface adjacent to the inspection apparatus, there has heretofore been no satisfactory solution to the problem of accurately and separately indicating discontinuities both inside and outside and recording the position and extent thereof when inspecting from one side of the ferromagnetic member only.

In evaluating the applicant's invention, the United States Patent Nos. 2,963,644; 2,770,773; 2,881,387 and 2,878,446 should be considered.

It is an object of this invention to provide a method and apparatus of establishing a magnetic field in a ferromagnetic member to be inspected, causing relative movement between the ferromagnetic member being inspected and applicant's novel apparatus whereby variations in the flux density and flux leakage are detected as indications and location of both inside and outside surface discontinuities.

It is another object of this invention to provide a method and apparatus for inspecting tubular goods from the inside for both inside and outside surface discontinuities, which tubular goods cannot be conveniently inspected from the outside.

It is still another object of this invention to provide a method and apparatus for inspecting ferromagnetic members for both inside and outside surface discontinuities simultaneously and in one operation or movement along the member being inspected.

These and other objectives will become apparent from the method and apparatus by reference to drawings wherein the same numerals refer to corresponding parts and in which:

FIG. 1 is an elevation view, partially in central vertical section, showing one embodiment of the invention in test position in a well casing.

FIG. 2 is an enlarged view of the cross-sectional portion of FIG. 1, with the power source circuit superimposed thereon and showing in greater detail a portion of the apparatus of this invention.

FIG. 3 is a plan view of the inspection unit of FIG. 2, as viewed from the well casing side.

FIG. 4 is an electrical circuit diagram of one apparatus embodiment as it would be arranged for recording the results of testing with the apparatus.

FIG. 5 is an extended portion of the recording tape shown in FIG. 4 and shows the graphic record for both inside and outside discontinuities.

Figure 6:
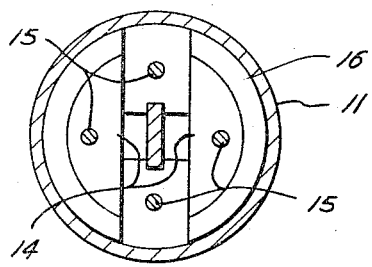
FIG. 6 is a cross-sectional view taken along line 6—6 of FIG. 1.

It has been discovered that when a portion of a ferromagnetic member, such as a section of well casing is substantially saturated with magnetic flux by the application of a magnetic force, stray flux will emerge from the casing in relatively close relationship to the thickness of the casing. Thus, the thinning of the casing, which may be caused by either inside discontinuities or outside discontinuities, will cause an increase flux leakage, other factors being constant. Thus, by measuring this leakage, an indication is received as to the condition of the pipe as to degree of corrosion or other discontinuities, both inside and outside. However, it is important to the corrosion engineer to know whether the pits, for example, are inside or outside, and the extent thereof, which will not be accurately revealed by measuring the flux leakage alone as indicated above.

It has also been discovered that when the well casing is so magnetized, as indicated above, the magnetic field can be so arranged that the density of the flux lines leaving the well casing and returning to the magnet will ordinarily be uniform in density. This uniform density of flux lines will, however, be distorted particularly by discontinuities in that surface of the well casing which is adjacent to the magnetizing means while remaining largely undistorted by discontinuities located on the surface of the well casing opposite the side from where the magnetizing means are employed.

Therefore, by substantially saturating a portion of a well casing with magnetic flux (which will generally be referred to hereinafter as providing the casing with a longitudinal magnetic field or longitudinal flux lines) and arranging for the flux lines to return to the magnetic means spaced radially inward from the inside wall of said member in a fairly uniform pattern (which will generally be referred to hereinafter as providing a radial magnetic field or radial flux lines, even though the goods being inspected may be other than tubular), it is then possible to provide a means whereby the variations in flux leakage from the longitudinal field and variations in flux density in the radial field can be measured as indications of both inside and outside surface discontinuities and separately recorded.

This invention generally relates to a method of and apparatus for detecting both inside and outside discontinuities in a ferromagnetic member such as a well casing by providing magnetizing means whereby a portion of such a member is provided with both a longitudinal magnetic field and a radial magnetic field. Detecting means are provided for measuring the variations in flux leakage from the longitudinal magnetic field and variations in flux density in the radial magnetic field. Means are also provided for causing relative movement between one surface of the member being inspected, as for example along the inside of a well casing, and the magnetizing means, whereby any variations in flux leakage from the longitudinal field and variations in the density of flux in the radial field will induce voltage changes in the detecting means, which voltage changes are transmitted to an indicating and/or recording means whereby the size and location of the discontinuities in the member being inspected can be observed and/or recorded.

Referring to FIG. 1, there is generally shown a ferromagnetic member in the form of a well casing 11. Disposed therein is one form of the apparatus invention wherein a carriage 12 is suspended in the well casing 11 by wire or cable 13. Suspended from carriage 12 by connecting rods 15 are a plurality of search unit housings 14, preferably formed of a non-magnetizing material, each of which has a mounting 16, holding a magnetic means, conveniently shown in the form of an electromagnet having an iron core 17, the details of which are best shown in FIG. 2.

The iron core 17 of the electromagnet is provided with a north pole 18 and a south pole 19. Each of these poles is provided with an energizing winding in the form of magnetizing coils 21 connected in series and to a suitable D.C. power source 22 by power leads 23. By utilizing a D.C. power source, the magnetic fields referred to have flux lines which are unidirectional, which materially aids in establishing the optimum magnetic fields. It will be observed that magnetizing coils are positioned in magnetizing coil recesses 25, which are channels provided in the contacting surfaces of north pole 18 and south pole 19.

Figure 7:
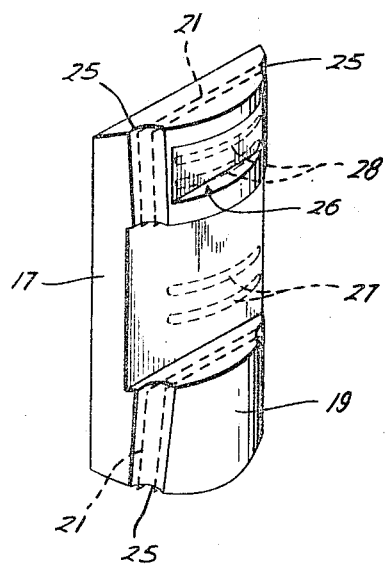
FIG. 7 is a schematic isometric view of the electromagnet shown in FIG. 2.

As best shown in FIG. 7, the poles of the electromagnet are formed in the shape of shoes, or otherwise curved so that the faces thereof will conform to the contour of the surface of the member being inspected and to thereby maintain a minimum and even air gap between the pole face and the member being inspected.

By the described arrangement of the iron core 17, north pole 18 and south pole 19, a recess 24 is provided in said electromagnet, which recess will generally be referred to as the longitudinal recess.

As best shown in FIGS. 3 and 7, the face of north pole 18 is provided with a rectangular recess 26, which will generally be referred to as the radial recess.

Referring to FIG. 2, magnetic-responsive means, in the form of a pair of longitudinal search coils 27 are aligned in longitudinal recess 24. These coils are so arranged that they are about mid-point between north pole 18 and south pole 19, or at about the point of magnetic null. The longitudinal search coils 27 are of arcuate configuration and aligned adjacent to the member being inspected so as to maintain a minimum and uniform air gap therebetween, as best seen in FIGS. 2 and 7.

Similarly, magnetic-responsive means in the form of a pair of radial search coils 28 are positioned in radial recess 26. These radial search coils 28 are of arcuate configuration and aligned adjacent to the member being inspected so as to maintain a minimum and uniform air gap between the member being inspected and the magnetic pole face.

As shown in FIG. 2, the magnetic means and magnetic-responsive means may be protected from dirt and pipe scale by a thin cover 29, formed of a non-magnetic material and shaped to the contour of the pole faces.

Referring to FIG. 4, a longitudinal lead circuit is shown wherein longitudinal search coils 27 are connected to a conventional voltage amplifier 31 by longitudinal search coil leads 32. The signal from amplifier 31 is connected to filter 33, to driver 34, and to galvanometer 36, which is provided with a stylus (not shown). This stylus is arranged to make graphic recording in the form of longitudinal graph 37 on recording tape 38.

Different types of signals will be picked up by the detecting coils, which differences are cause by different kinds of discontinuities, and even by friction and vibration of the inspecting apparatus. Accordingly, the filters selected for use are those that will readily pass with little or no attenuation that band of signals in which the operator is most interested, as for example pits, and reject the balance of the signals.

The voltage changes detected by radial search coils 28 are similarly graphically recorded in the form of a radial graph 39 by the arrangement of a radial lead circuit. However, in this instance, the signal from the radial search coils 28 are carried via radial search coil leads 40, a conventional amplifier 31a, filter 33a, delay circuit 41, driver 34a, and galvanometer 36a, also provided with a stylus (not shown).

Figure 8:
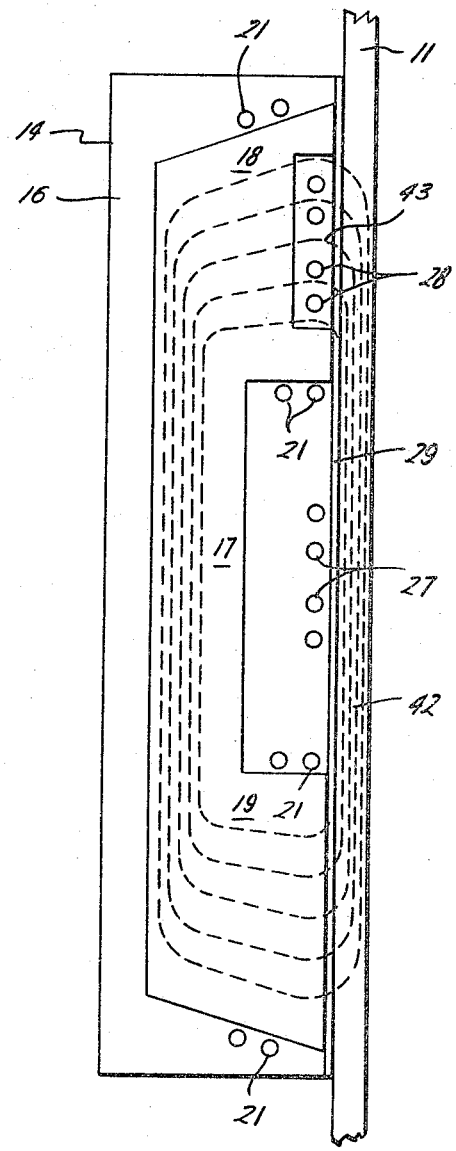
FIG. 8 is a view similar to FIG. 2 but showing the magnetic field established during operation of the apparatus.

In operation, the applicant's apparatus is placed next to a ferromagnetic member to be inspected, as for example on the inside surface of a well casing, as shown in FIG. 8. Magnetizing coils 21 are then connected to a D.C. power source 22, thus substantially magnetically saturating that portion of the well casing 11 adjacent to the electromagnet, and thereby establishing longitudinal magnetic field 42 in said casing, which magnetic field has unidirectional flux lines. At the same time, there will be a flux movement from well casing 11 to north pole 18, which movement establishes radial magnetic field 43. By having the shoe of north pole 18 contoured to fit the surface of the member being inspected and the air gap therebetween at a minimum, the flux density of radial magnetic field 43 will ordinarily be quite uniform.

Once the magnetic fields have been established, relative movement is effected between the member being inspected and the magnetizing means. In the apparatus as shown in FIG. 8, the direction of movement would normally be in the direction of the north pole. This could be accomplished by moving the magnetizing means upward, or moving the well casing downward, or both.

The flux leakage from longitudinal magnetic field 42 increases at those places on well casing 11 which have a reduced thickness, which may be caused by corrosion or the like, either inside or outside. Therefore, as longitudinal search coils 27 pass over a portion of well casing 11 having either inside or outside surface discontinuities, the variation in flux leakage will induce a voltage response in longitudinal search coils 27, which response will be transmitted to recording tape 38 thereby recording longitudinal graph 37.

It will be observed that by causing relative movement between well casing 11 and the magnetic means in the direction of the north pole, i.e., in a direction generally parallel with the longitudinal magnetic field 42, the longitudinal search coils 27 will be caused to pass along the same surface of well casing 11 that radial search coils 28 have passed over just a moment before. In addition, the magnetizing means will also be caused to move in a direction transverse to radial magnetic field 43.

Since radial search coils 28 are aligned in radial magnetic field 43, and since the flux density of this field is primarily distorted by surface discontinuities adjacent to the magnetic means, any pits or discontinuities on the inside surface will induce voltage changes in radial search coils 28, which changes will be recorded on recording tape 38 in the form of radial graph 39. However, in this instance, the radial lead circuit from radial search coils 28 to recording galvanometer 36 is provided with a delay circuit 41, which delay is arranged to compensate for the time interval required for the longitudinal search coils 27 to pass over the same surface of well casing 11 which radial search coils 28 have just previously traversed.

Therefore, longitudinal graph 37 and radial graph 39 are simultaneously recorded on recording tape 38 so that a record is made of the discontinuities encountered in the well casing. Since longitudinal graph 37 shows both inside and outside discontinuities and since radial graph 39 records only inside discontinuities, a comparison of the two graphs will reveal whether the discontinuity was inside and outside. In addition, the circuit arrangement can be so designed that large discontinuities effect wider oscillations in the graphs than do minor variations.

It is thus possible by the use of the above described apparatus and method, to discern both inside and outside discontinuities in a ferromagnetic member and the degree of such discontinuities when inspecting means are passed along only one side of the member.

Referring to FIG. 5, a small deep outside pit will be recorded as O.D. pit 44 on longitudinal graph 37, but will not be recorded on radial graph 39. A small deep inside pit will be recorded as I.D. pit 46 on both longitudinal graph 37 and radial graph 39. A pitted area on the inside of the casing will be recorded as I.D. pitted area 47 on both graphs.

With respect to the magnetic means, it is important that said means be adapted for disposition at a point adjacent to the surface of the member being inspected. The entire member need not be magnetized, but that portion extending from the south pole to the north pole should be substantially saturated. Various magnetic means may be used with this invention, but electromagnetic means are preferable because of the relatively small space available in a well casing, for example, and because of the rather substantial magnetic saturation required in the member being inspected.

Other magnetic-responsive means may be used, as for example flux gate magnetometers or a single pickup coil of the type shown in FIG. 3. However, the preferred form is a pair of coils such as radial search coils 28 aligned side by side and connected in series opposed. It will be noted that the ends of the coils are provided with narrow hairpin turns 48, which turns, in the case of radial search coils 28 are arranged to be transverse to radial magnetic field 43, and in the case of longitudinal search coils 27, are arranged to be parallel with longitudinal magnetic field 42. This narrow configuration of hairpin turns 48 makes the coils particularly sensitive to small surface discontinuities, such as pits. By having two coils arranged in series opposed, any voltage variation that might be caused by non-harmful discontinuities, such as pipe scale causing slight lift-off of the inspection apparatus or a bend in the casing, will nearly simultaneously effect both coils in approximately equal and opposite manner, thus cancelling out any voltage that might otherwise be induced by non-harmful variation in the well casing.

It is obvious that relative movement between well casing 11 and the magnetic means may be effected in a direction opposite to that described above, in which case delay circuit 41 would be placed in the longitudinal lead circuit, to thereby effect simultaneous recording of inside and outside surface discontinuities. Furthermore, a simple logic circuit could be arranged to replace the disclosed recording apparatus, but still provide the same information. One form of logic circuit which could be used is shown in United States Patent Number 2,729,785, whereby two lines could be established on a graph, and each line would represent only either I.D. pits or O.D. pits. Furthermore, the delay could be arranged in a mechanical manner by providing the galvanometer in the circuit to be delayed, with a longer stylus, in which even the speed of traverse of the search unit would have to be fairly uniform.

The apparatus of this invention can be used as a single unit as described above, or a plurality of such units can be arranged in one apparatus as shown in FIG. 1. There it will be observed that four such units are utilized, each being mounted in a separate search unit housing 14. Since it is desirable to make only one pass through a well casing, the four units are arranged to cover the full circumference of the well casing. This is accomplished by arranging the search units in pairs, one pair below the other. The units in each pair are urged outwardly against the well casing by leaf springs 49 as shown in FIGS. 1 and 6. In operation, the magnetic field causes considerable drag on the search units. Thus, the preferred manner of use in a well would be to lower carriage 12 to the bottom of the well or casing to be inspected, then energizing the magnet and cause the carriage to move upwardly at a rather uniform rate of speed by lifting on cable 13. Thus, the full circumference of the casing is covered in one pass through the pipe. By utilizing suitable circuits, a recording could be made similar to that described above for one search unit.

When pipes are being inspected by this method, a ready determination can be made as to whether or not the surface pits are either I.D. or O.D. This will permit a corrosion engineer to determine what kind of treatment to give either the pipe or the fluid being used in the pipe to correct these deficiencies. The invention has the unique advantage of being able to determine not only the degree of the discontinuities but their location as to either inside or outside, in a single pass along the member being inspected. Additionally, a single magnetic means is used for making these detections. This is of tremendous importance to certain applications of the invention as for example, in testing casing in an oil well wherein the size or diameter of the casing does not permit bulky equipment. Furthermore, only one pass of the apparatus along the members being inspected is required. This has advantages not only in economy of time, and ease of operation, but in many instances is the only effective means whereby inside and outside surface discontinuities can be effectively detected.

Thus, it will be seen that the industry has been provided with a method and apparatus for simultaneously detecting inside and outside discontinuities in a ferromagnetic member.

Furthermore, the discovery that the variations in radial density in the radial magnetic field were best adapted to show inside surface discontinuities whereas the flux leakage from the longitudinal field show both internal and external discontinuities has made it practical to develop the foregoing apparatus and method to perform the search for both inside and outside pits in one operation.

There are, of course, many other variations which are possible in this invention. For example, in addition to inspecting tubular ferromagnetic members such as well casings from the inside, the apparatus is equally effective when adapted for location on the outside of a casing or pipe and in a horizontal plane. Furthermore, the device could be used for detecting discontinuities in other forms of goods wherein two surfaces are to be inspected in one operation from a point adjacent one side only.

Modifications may be made in the invention particularly described without departing from the scope of the invention. Accordingly, the foregoing description is to be construed illustratively only and is not to be construed as a limitation upon the invention as described in the following claims.

What is claimed is:

1. The method of detecting both inside and outside surface discontinuities in an elongate ferromagnetic member having an inside surface radially separated from its outside surface, comprising the steps of:
   establishing a magnetic field with longitudinal flux lines which extend longitudinally through said ferromagnetic member and radial flux lines that extend from said member,
   causing relative movement between said field and said member in a direction generally parallel to the longitudinal flux lines of said field,
   detecting variations in flux leakage of said longitudinal flux lines during such relative movement as an indication of a discontinuity in at least one of the surfaces of said members, and
   detecting variations in the flux density of said radial flux lines adjacent the surface from which they extend during such relative movement as an indication of discontinuity in the surface of said member adjacent which variation in the flux density is detected.

2. The method of detecting both inside and outside surface discontinuities in an elongate ferromagnetic member having an inside surface radially separated from its outside surface, comprising the steps of:
   magnetizing at least a portion of said member to establish a longitudinal field through said portion and a radial magnetic field extending from said portion, causing a relative movement between said longitudinal field and said member in a direction generally parallel to said longitudinal magnetic field, detecting variations in flux leakage of said longitudinal field during such relative movement as an indication of a discontinuity in at least one of the surfaces of said member, detecting variations in the flux density of said radial field adjacent the surface from which they extend during such relative movement as an indication of discontinuity in the surface of said member adjacent which variation in the flux density is detected, and correlating the detection of said flux leakage and said flux density.

3. The method of detecting both inside and outside surface discontinuities in an elongate ferromagnetic member having an inside surface radially separated from its outside surface, comprising the steps of:

substantially saturating at least a portion of said member with magnetism and establishing therein a magnetic field having longitudinal flux lines extending longitudinally through said portion and radial flux lines that extend from said portion, causing relative movement between said field and said member in a direction generally parallel to said longitudinal flux lines and transverse to said radial flux lines, detecting variations in flux leakage of said longitudinal flux lines during such relative movement as an indication of a discontinuity in at least one of the surfaces of said member, and detecting variations in the flux density of said radial flux lines adjacent the surface from which they extend during such relative movement as an indication of discontinuity in the surface of said member adjacent which variations in the flux density is detected.

4. The method of detecting both inside and outside surface discontinuities in an elongate ferromagnetic member having an inside surface radially separated from its outside surface, comprising the steps of:

magnetizing at least a portion of said ferromagnetic member and establishing therein a unidirectional magnetic field, a portion of which extends longitudinally through said ferromagnetic member and a portion of which extends radially from the surface of said ferromagnetic member, causing relative movement between said field and said member in a direction generally parallel to said longitudinal portion of said field and transverse to said radial portion of said field, detecting changes in flux leakage adjacent said longitudinal portion of said field and detecting changes in the flux density within said radial portion of said field extending from said surface during such relative movement, recording changes in flux leakage of said longitudinal portion of said field as indications of discontinuities in the surfaces of said member, recording changes in flux density of said radial portion of said field as indications of discontinuities in the surface of said member from which radial portion of said field extends, and correlating the detection of said flux leakage and said flux density.

5. The method of simultaneously and separately detecting inside and outside surface discontinuities in an elongate tubular ferromagnetic member, said detecting being made from the inside surface of said member, comprising the steps of:

substantially saturating at least a portion of said ferromagnetic member with magnetism and establishing therein a unidirectional longitudinal magnetic field extending through said portion, and a radial magnetic field extending from the wall of said ferromagnetic member to a point spaced radially inwardly from the inside surface of said member, causing relative movement between said fields and said member in a direction generally parallel to said longitudinal field and transverse to said radial field, detecting changes in flux density in said radial magnetic field at a point adjacent the internal surface of said ferromagnetic member and within said radial magnetic field and changes in flux leakage from said longitudinal magnetic field at a point adjacent said longitudinal magnetic field during such relative movement, separately recording changes in said flux leakage as an indication of a discontinuity in at least one of the surfaces of said member, and changes in said flux density as an indication of a discontinuity in the inside surface of said member, and correlating the detection of said flux leakage and said flux density.

6. In an apparatus for simultaneously and separately detecting inside and outside surface discontinuities in an elongate tubular ferromagnetic member, such detecting being made from the inside surface of said member, the combination comprising:

a magnetic means adapted for disposition adjacent the inside surface of said ferromagnetic member for establishing a longitudinal magnetic field through at least a portion of said member and a radial magnetic field extending from said member, first magnetic-responsive means adapted for disposition with respect to the inside surface of said ferromagnetic member and fixedly positioned with respect to said magnetic means, for responding to changes in flux leakage from said longitudinal field, second magnetic-responsive means adapted for disposition with respect to the inside surface of said ferromagnetic member and fixedly positioned with respect to said magnetic means, for responding to changes in flux density in said radial field, means for effecting relative movement between said magnetic means and said ferromagnetic member in a direction generally transverse to said radial field, and indicator means operably connected to said first magnetic-responsive means for indicating changes in flux leakage as indications of discontinuities in at least one surface of said member, and operably connected to said second magnetic-responsive means for indicating changes in flux density as indications of discontinuities in only the inside surface of said member.

7. In an apparatus for simultaneously and separately detecting inside and outside surface discontinuities in an elongate tubular ferromagnetic member, such detecting being made from the inside surface of said member, the combination comprising:

a magnetic means adapted for disposition at a point adjacent the inside surface of said ferromagnetic member for establishing a longitudinal magnetic field through at least a portion of said member and a radial field extending from said member, magnetic-responsive means disposed with respect to said inside surface of said ferromagnetic member and fixedly positioned with respect to said magnetic means, for responding to changes in flux leakage from said longitudinal field and changes in flux density in said radial field, means for effecting relative movement between said magnetic means and said ferromagnetic member in a direction generally parallel to said longitudinal field and generally transverse to said radial field, means operably connected to said magnetic-responsive means for recording changes in flux leakage as indications of discontinuities in at least one surface of said member and for recording changes in flux density as indications of discontinuities in said inside surface of said member.

8. In an apparatus for simultaneously and separately detecting inside and outside surface discontinuities in an elongate tubular ferromagnetic member, said detecting being made from the inside surface of said member, the combination comprising:
   an electromagnetic means adapted for disposition at a point adjacent the inside surface of said member for simultaneously establishing a substantially saturating longitudinal magnetic field through at least a portion of said member and a radial magnetic field extending from said member,
   first magnetic-responsive means disposed with respect to the inside surface of said ferromagnetic member and fixedly positioned with respect to said electromagnetic means, for responding to changes in flux leakage from said longitudinal field,
   second magnetic-responsive means disposed with respect to the inside surface of said ferromagnetic member and fixedly positioned with respect to said electromagnetic means, for responding to changes in flux density in said radial field,
   means for effecting relative movement between said electromagnetic means and said ferromagnetic member in a direction generally parallel to said longitudinal field and transverse to said radial field,
   indicator means operably connected to said first magnetic-responsive means for indicating changes in flux leakage as indications of discontinuities in at least one surface of said member, and operably connected to said second magnetic-responsive means for indicating changes in flux density as indications of discontinuities in the inside surface of said member.

9. In an apparatus for simultaneously and separately detecting inside and outside surface discontinuities in an elongate tubular ferromagnetic member, said detecting being made from the inside surface of said member, the combination comprising:
   electromagnetic means having a north pole and a south pole and adapted for disposition at a point adjacent the inside surface of said member for simultaneously establishing a substantially saturating longitudinal magnetic field through at least a portion of said member and a radial magnetic field extending from said member adjacent said poles,
   a first magnetic-responsive means aligned about midpoint between said north pole and said south pole adjacent said inside surface of said ferromagnetic member for responding to changes in flux leakage from said longitudinal field,
   a second magnetic-responsive means disposed adjacent at least one pole of said electromagnetic means and adjacent said inside surface of said ferromagnetic member for responding to changes in flux density in said radial field,
   means for effecting relative movement between said electromagnetic means and said first and second magnetic-responsive means, and said ferromagnetic member,
   indicator means operably connected to said first magnetic-responsive means for separately indicating changes in flux leakage as indications of discontinuities in at least one surface of said member and operably connected to said second magnetic-responsive means for indicating changes in flux density as indications of discontinuities in the inside surface of said member, and
   display means for presenting said flux leakage and flux density indications synchronously.

10. In an apparatus for simultaneously and separately detecting inside and outside surface discontinuities in an elongate tubular ferromagnetic member, and detecting being made from the inside surface of said member, the combination comprising:
   electromagnetic means having a north pole and a south pole and adapted for disposition at a point adjacent to said inside surface of said ferromagnetic member for simultaneously establishing a substantially saturating magnetic field with longitudinal flux lines which extend longitudinally through at least a portion of said member and radial flux lines that extend from said member,
   a pair of magnetic-responsive means with
      one means of said pair aligned about midpoint between said north pole and said south pole and effective to response changes in longitudinal flux leakage from said member, and
      the other means of said pair aligned adjacent to the face of one of said poles and effective to response changes in flux density of said radial flux lines,
   means for effecting relative movement between said electromagnetic means and said ferromagnetic member in a direction generally parallel with said longitudinal flux lines and generally transverse to said radial flux lines, and
   means operably connected to said magnetic-responsive means for recording changes in flux leakage as indications of discontinuities in at least one surface of said member, and for recording changes in flux density as indications of discontinuities in the inside surface of said member and including correlating means for presenting said flux leakage and flux density recording synchronously.

11. In an apparatus for simultaneously and separately detecting inside and outside surface discontinuities in an elongate tubular ferromagnetic member, said detecting being made from the inside surface of said member, the combination comprising:
   an electromagnet comprising
      a core with south and north poles shaped for disposition closely adjacent the inside surface of said ferromagnetic member, and
      an electromagnet winding operably disposed on said core to generate a magnetic field having unidirectional, substantially saturating flux lines extending longitudinally through at least a portion of said ferromagnetic member and radial flux lines extending from said member,
   a first magnetic-responsive means aligned about midpoint between said south and north poles and closely adjacent to the surface of said ferromagnetic member for sensing changes in longitudinal flux leakage from said member,
   a second magnetic-responsive means aligned adjacent the face of said north pole for sensing changes in flux density of said radial flux lines,
   means for effecting relative movement between said electromagnet and said ferromagnetic member in a direction generally parallel to said longitudinal flux lines and generally transverse to said radial flux lines in a direction such that said north pole precedes said south pole,
   first recording means connected to said first magnetic-responsive means for recording the effects of said changes in longitudinal flux leakage as indications of discontinuities in at least one surface of said member,
   second recording means connected to said second magnetic-responsive means for recording the effects of said changes in flux density as indications of discontinuities in the inside surface of said member, and
   correlation means for presenting said flux leakage and said flux density recordings synchronously.

12. In an apparatus for simultaneously and separately detecting inside and outside surface discontinuities in an elongate tubular ferromagnetic member, said detecting being made from the inside surface of said member, the combination comprising:

an electromagnet having a north pole and a south pole shaped for disposition adjacent to said inside surface of said ferromagnetic member for establishing a substantially saturating longitudinal magnetic field through at least a portion of said ferromagnetic member and a radial magnetic field extending from said member, a first detector coil disposed about midpoint between said north and said south poles effective for detecting changes in flux leakage from said longitudinal magnetic field, a second detector coil aligned adjacent to one pole of said electromagnet and effective to respond to changes in flux density in said radial magnetic field, means for effecting relative movement between said electromagnet and said ferromagnetic member in a direction generally parallel to said longitudinal field and generally transverse to said radial field, indicator means operably connected to said first detector coil for indicating changes in flux leakage as indications of discontinuities in at least one of the surfaces of said member, said indicator means also separately operably connected to said second detector coil for indicating changes in flux density as indications of discontinuities in the inside surface of said member, and correlator means for synchronously presenting said flux leakage and flux density indications.

13. In an apparatus for simultaneously and separately detecting inside and outside surface discontinuities in an elongate tubular ferromagnetic member, said detecting being made from the inside surface of said member, the combination comprising:

an electromagnet comprising
an iron provided with a north pole and a south pole and a longitudinal recess therebetween, said poles being shaped for disposition adjacent the inside surface of said ferromagnetic member, said north pole having a radial recess in the face thereof, and an electromagnetic winding disposed on said core to generate magnetism sufficient to substantially saturate at least a portion of said member and form a unidirectional longitudinal magnetic field extending through said portion and a radial magnetic field extending from said member, a first pair of detector coils aligned about midpoint between said north and south poles and closely adjacent said ferromagnetic member and effective for detecting changes in flux leakage from said longitudinal magnetic field, a second pair of detector coils aligned in said radial recess and effective to respond to changes in flux density in said radial magnetic field, means for effecting relative movement between said electromagnet and said member in a direction generally parallel with said longitudinal field and generally transverse to said radial field, and electrical circuit means operably connected to said first pair of detector coils for indicating the effects of either inside or outside surface discontinuities, said electrical circuit means also operably connected to said second pair of detector coils for indicating the effects of inside surface discontinuities, an indication from said first coil pair without an indication from said second coil pair indicating an outside surface discontinuity.

14. In an apparatus as claimed in claim 13, the combination wherein the coils in said pairs of detector coils are connected in series opposition and are shaped in hairpin turns, the turns in said first pair of detector coils being aligned parallel to said longitudinal field and the turns in said second pair of detector coils being aligned transverse to said radial field.

15. An apparatus as claimed in claim 13, the combination wherein
said electromagnetic winding is in the form of a first winding near the north pole and a second winding near the south pole, and wherein
said electrical circuit means comprises
a longitudinal lead circuit connecting said first pair of detector coils with a recording stylus,
a radial lead circuit connecting said second pair of detector coils with a recording stylus, and
delay means connected in one of said lead circuits for synchronizing the recording from said styluses.

References Cited by the Examiner
UNITED STATES PATENTS

| | | | |
|---|---|---|---|
| 1,946,196 | 2/1934 | Drake et al. | 324—37 |
| 2,770,773 | 11/1956 | Cooley | 324—37 |
| 2,869,073 | 1/1959 | McKee et al. | 324—37 |
| 2,881,387 | 4/1959 | Wood | 324—37 |
| 2,963,644 | 12/1960 | Nuttall | 324—37 |
| 2,992,390 | 7/1961 | DeWitte | 324—37 |

WALTER L. CARLSON, *Primary Examiner.*

RICHARD B. WILKINSON, *Examiner.*

R. J. CORCORAN, *Assistant Examiner.*

UNITED STATES PATENT OFFICE
CERTIFICATE OF CORRECTION

Patent No. 3,317,824

May 2, 1967

Fenton M. Wood

It is hereby certified that error appears in the above numbered patent requiring correction and that the said Letters Patent should read as corrected below.

Column 3, line 72, for "cause" read -- caused --; column 9, line 75, for "and" read -- said --; column 11, line 38, after "iron" insert -- core --; column 12, line 7, for "electromagnetic" read -- electromagnet --.

Signed and sealed this 14th day of November 1967.

(SEAL)
Attest:

Edward M. Fletcher, Jr.
Attesting Officer

EDWARD J. BRENNER
Commissioner of Patents